Dec. 13, 1955  R. S. ENABNIT  2,726,821
APPARATUS FOR DEPOSITING SPECIALLY SHAPED CONVOLUTIONS
OF A CONTINUOUS ARTICLE ON ROLLS
Filed May 20, 1950  2 Sheets-Sheet 1

INVENTOR
Robert S. Enabnit

BY
R. L. Miller
ATTORNEY

Dec. 13, 1955　　　　　　　R. S. ENABNIT　　　　　2,726,821
APPARATUS FOR DEPOSITING SPECIALLY SHAPED CONVOLUTIONS
OF A CONTINUOUS ARTICLE ON ROLLS
Filed May 20, 1950　　　　　　　　　　　　2 Sheets-Sheet 2
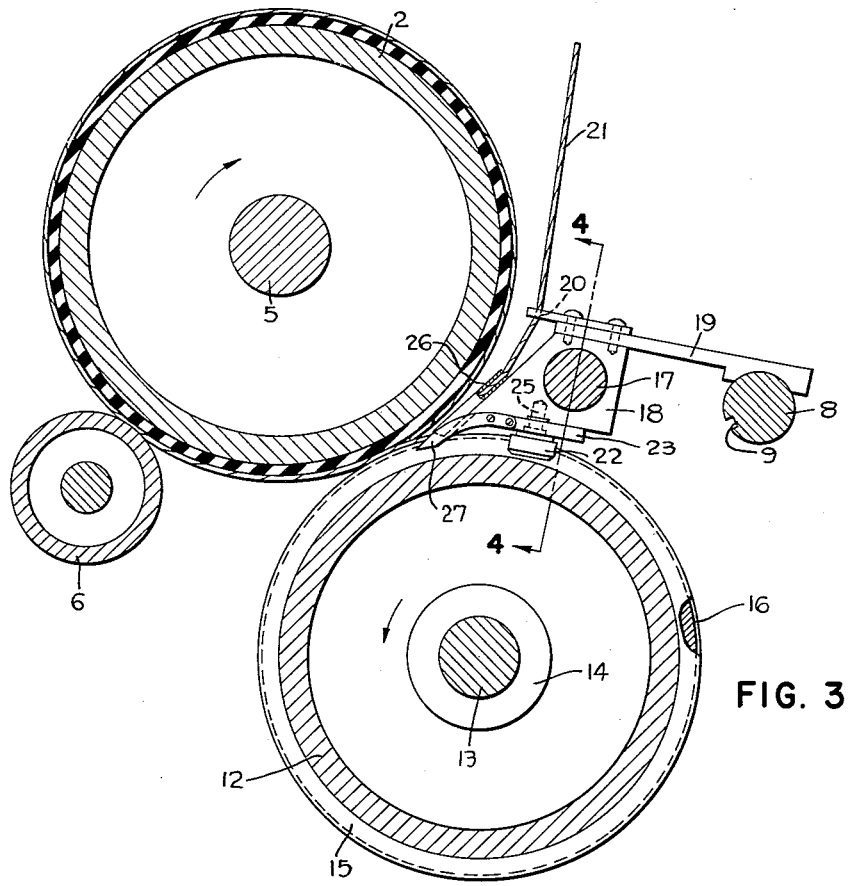
FIG. 3
FIG. 4
INVENTOR
Robert S. Enabnit
BY
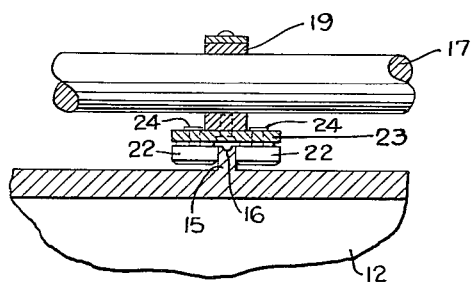
ATTORNEY

United States Patent Office 2,726,821
Patented Dec. 13, 1955

2,726,821

APPARATUS FOR DEPOSITING SPECIALLY SHAPED CONVOLUTIONS OF A CONTINUOUS ARTICLE ON ROLLS

Robert S. Enabnit, Cuyahoga Falls, Ohio, assignor, by mesne assignments, to The Goodyear Tire & Rubber Company, a corporation of Ohio Application May 20, 1950, Serial No. 163,316

4 Claims. (Cl. 242—31)

This invention relates to apparatus for depositing convolutions of a continuous flexible member in a predetermined manner on a roll or cylinder, which apparatus particularly is suited for depositing wire, cord or other flexible, continuous articles onto a cylindrical surface as a plurality of substantially oval-shaped, immediately adjacent convolutions.

The present invention relates particularly to the provision of apparatus used in the manufacture of air bags for use in high electrical frequency vulcanization of rubber articles, such as tires. In such air bags, it has been determined that it is very desirable to have reinforcing wires extending therein in arcs of, or complete oval-shaped convolutions, each of which lies in a plane at an appreciable angle such as from about 30 to 60 degrees to a radius of the air bag so that on expansion of the air bag, the reinforcing wire does not directly limit or curtail expanding movement of the air bag but permits limited expansion of the air bag without any severe or undesirable flexure, pulling or rearrangement of the wire convolutions, or wires embedded in the air bag. Heretofore it has been very difficult, if not impossible, insofar as I am aware, to form such angularly positioned convolutions of wire in a tire or air bag structure except by manually wrapping the wire around the tire, or air bag carcass in the desired direction. Such manual positioning of wire in an air bag body obviously is a tedious, costly operation and might not achieve the accuracy in the positioning of the wires that would be desired.

It is the general object of the present invention to overcome the foregoing and other difficulties with previous methods of building air bags and similar articles and to provide apparatus for use in building air bags and other articles of the class described, which apparatus is characterized by the positive, effective deposit of continuous convolutions of an elongate article in desired shape upon a cylindrical receiving roll.

A further object of the invention is to provide apparatus for depositing a continuous wire in a plurality of substantially oval-shaped convolutions on a cylindrical wind-up drum.

Another object of the invention is to provide a relatively simple but sturdy apparatus for forming special electricity conductor containing rubber plies for use in the manufacture of an air bag or the like.

Yet a further object of the invention is to provide apparatus for the use in the manufacture of flexible but resilient air bags that have limited expansion when in use, which air bags are built substantially in conformity with tire building procedures.

The foregoing and other objects and advantages of the invention will be made more apparent as the specification proceeds.

For a better understanding of the invention, reference should be had to the accompanying drawings, wherein:

Fig. 3 is a vertical section taken on line 3—3 of Fig. 2; and

Fig. 4 is a fragmentary vertical section taken on line 4—4 of Fig. 3.

Figure 1:
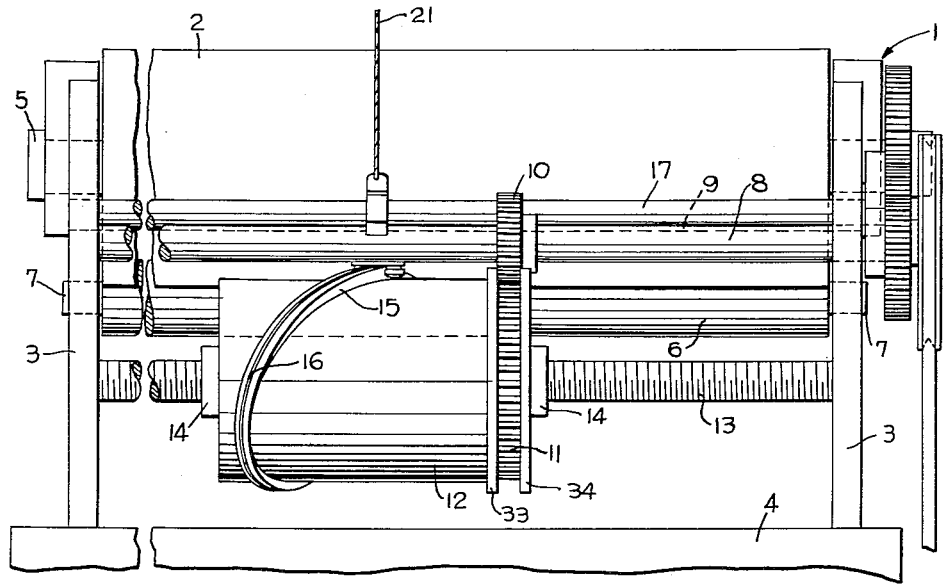
Fig. 1 is an elevation, partially broken away, of apparatus embodying the principles of the invention.
Figure 2:
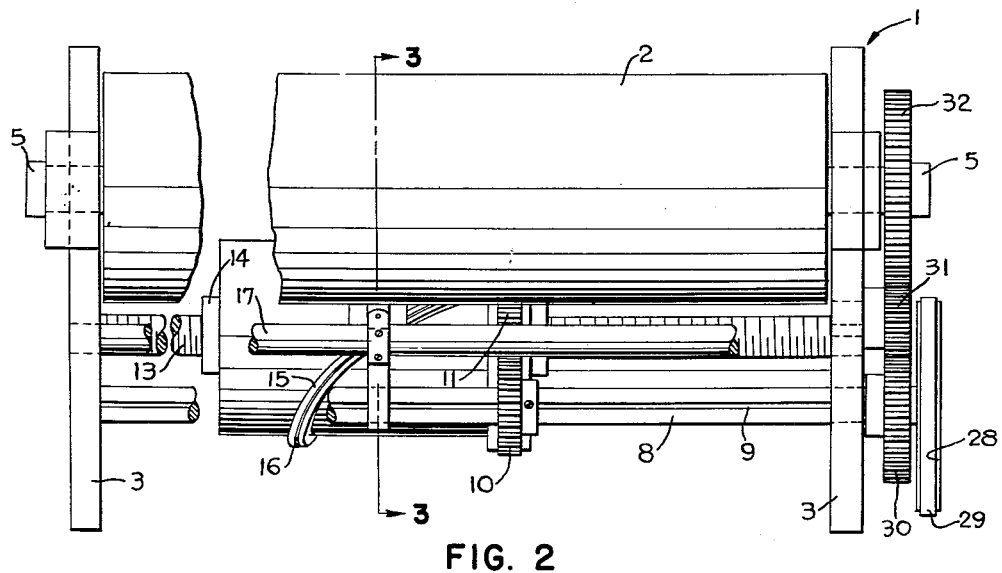
Fig. 2 is a plan, also partially broken away, of the apparatus as shown in Fig. 1.

Broadly speaking, the present invention resides in apparatus which includes a driven wind-up roll or cylinder that has a driven control drum member positioned on a shaft parallel to and adjacent the wind-up roll with means being provided for rotating and moving the control member along parallel to the axis of the wind-up roll. The apparatus also includes a cam which is associated with the control member, a guide shaft positioned parallel to the roll and a guide that is carried by the guide shaft and engaged with the article to be deposited upon the drum, which guide is engaged with the cam and is moved longitudinally of the guide shaft thereby for controlling the deposit of the article on the roll.

Referring now specifically to the details of the apparatus shown in the drawings, the cord depositing apparatus of the invention is referred to generally by the numeral 1. This apparatus 1 includes a wind-up roll or cylinder 2 which is suitably journaled in upstanding housing plates 3 that are secured to and protrude upwardly from a conventional frame member 4, or other similar means. The wind-up roll 2 is shown carried by a shaft 5, which may be an integral part of the roll 2 and usually a back-up roll 6 is provided that is carried by shaft 7 which also may be journaled in or supported by the housing plates 3. The shaft 7 is parallel to the shaft 5 and usually placed to the rear thereof.

An important feature of the present invention is that a driven shaft 8 may also be journaled in and extend between the housing plates 3 with this shaft 8 having a slot 9 formed thereon so that a control gear 10 can be engaged with the shaft 8 and be rotatably carried thereby although movable longitudinally therealong since the gear 10 is provided with a pin or key (not shown) that protrudes into the slot 9.

The control gear 10 is provided for driving the actual control member of the apparatus of the invention. In order to rotate or drive such a member, the gear 10 is engaged with a gear 11 which is suitably secured to or formed on a control drum or roll 12 that is positioned on a threaded shaft 13. This threaded shaft 13 is suitably supported in and extends between the housing plates 3 parallel to the shaft 5, and at least the portion of the control drum 12 that engages the shaft to position the drum 12 thereon is tapped and it may comprise sleeves 14 which are suitably secured to the drum at the ends thereof. Thus the sleeves 14 engage with the threads on the shaft 13 whereby any rotation of the control drum will move same axially along the threaded shaft 13.

Actual control of deposit of a wire or other similar continuous member upon the roll 2 is effected by means of a cam 15 which is formed in the shape of a raised rib that extends around the periphery of a relatively elongated portion of the control drum 12, as indicated in Fig. 1 of the drawing. It will be seen in Fig. 1 that the cam 15, which is endless, extends around the periphery of the control drum 12 at an appreciable angle such as from 30° to 60° with a radius of such drum, correspondingly, the shape of each convolution is substantially oval or elliptical with the major axis extending at 30° to 60° with the longitudinal axis of the roll 2. The cam lies in a plane and the inclination of the cam determines the positioning of the convolutions of the wire on the roll 2. Fig. 4 best shows that the cam 15 is provided with a groove 16 in its outer surface, the depth of the groove being substantially one-half the diameter of a wire or cord to be deposited by the apparatus of the invention.

Yet a third shaft 17, or rod is secured to and extends between the housing plates 3 with such rod 17 being immediately adjacent and parallel to the wind-up roll 2. Positioned on the rod 17 is a control or guide block or member 18 that is free for relative sliding movement longitudinally of the rod 17. The guide block 18 normally has a guide finger 19 secured thereto or otherwise carried thereby, which guide finger extends substantially normally to the rod 17 and has a guide aperture 20 formed therein at one end thereof adjacent the roll 2 for threading a wire 21 therethrough. The wire 21 is to be deposited in a desired shape of convolution on the wind-up roll 2. Another portion of the guide finger 19 is adapted to bear upon the upper surface of the shaft 8 in order to retain the guide finger in a fixed position and prevent rotation of the guide block 18 on the rod 17, since the normal force exerted on the guide block will urge the guide finger 19 down into engagement with the shaft 8.

The actual engagement of the guide block or member 18 with the raised cam rib 15 is made through a pair of control guide rollers 22 that are carried by a positioning plate or block 23. The rollers 22 are secured to the block 23 for rotation with relation thereto by means of pins, rivets or other similar means 24. The block itself is pivotally secured to the guide block 18 by a pivot pin or screw 25. Thus the guide shoe or block 23 can pivot in one plane with relation to the guide positioning block 18 dependent upon the particular relationship between the cam 15 and the guide block 18 at that particular instant. However, in all events, the rollers 22 snugly engage with opposite sides of the raised control cam to move the guide block and associated means longitudinally of the apparatus of the invention. Thus the guide block 18 can be slid back and forth along its positioning shaft 17 somewhat like a shuttle in a loom.

An accurate positioning of the cord or wire 21 to be deposited by the apparatus of the invention is faciliated by threading such wire through a tube 26 that is secured to an inclined portion of the guide block 18 positioned adjacent the periphery of the roll 2. The tube 26 extends to a point immediately adjacent the periphery of the control cam 15 and the block 23 is provided with a pair of resilient fingers 27 that protrude therefrom and engage the opposed sides of the cam 15 adjacent the end of the tube 26 to prevent any possible movement of the wire 21 laterally of the apparatus. Of course, the tube 26 is directly aligned with the groove 16 in the cam 15 and the wire 21 moves into this groove being retained therein for controlled deposit onto the roll 2 by substantially immediate contact with the adjacent surface of the roll 2. The position of the plate 23 will be varied with relation to the guide block 18 as the cam 15 twists the plate 23 and exerts a force on the guide block 18 through the rollers 22 and plate 23 in order to move the guide block longitudinally of the rod 17.

It will be appreciated that the shaft 8 can be driven in any conventional manner and a pulley 28 is shown positioned on a protruding portion of this shaft 8 and a suitably driven belt 29 is engaged therewith to drive same. The drive shaft 8 also may have a gear 30 secured thereto with this gear engaging with and driving an idler gear 31. Gear 31 is suitably journaled in one of the housing plates 23 and is meshed with and drives a gear 32 that is secured to a protruding portion of the shaft 5 on which the wind-up roll 2 is positioned.

Side discs 33 and 34 are provided on the gear 11 to engage with the sides of the gear 10 and move same longitudinally of the shaft 8 with axial movement of the drum 12.

It will be appreciated that any desired means may be associated with the apparatus of the invention to facilitate deposit of an article, such as a rubber sheet or ply, onto the surface of the roll 2 prior to or after deposit of a plurality of convolutions of the wire 21 onto such roll. The wire 21 is of suitable composition and size.

If desirable, another rubber sheet or ply may be applied over the wire convolutions and the back-up roll 6 will force the rubber sheet or ply around the wire convolutions to completely enclose them. The built-up material on the roll 2 may be removed therefrom in any manner, such as by cutting, preferably along a longitudinal line extending through either of the ends of the major axes of each loop (the portion most advanced toward either end of the roll).

In operation, it will be realized that the guide block 18 will be slid rapidly back and forth along the rod 17 with rotary movement of the control drum 12 but that such reciprocation of the guide on its positioning rod will gradually advance the guide from one end or edge of the apparatus over to the other. The apparatus may be provided with any desired means (not shown) by which the control drum 12 can be freed from the threaded shaft 13 and be rapidly moved from one end or edge of the threaded shaft 13 to the other end thereof whereby the apparatus is prepared for another operative cycle, or the drive of the shaft 13 may be reversed to achieve this result.

Obviously the rolls 2 and 6 may be of any desired composition and are of conventional construction, whereas any desired type of control cam 15 may be formed on or secured to the periphery of the control drum 12. The cam 15 normally defines a plane that is inclined at an angle of from about 30° to 60° with a radius of the drum 12.

It has been determined that it is preferable to have the diameter of the wind-up roll 2 equal to the diameter of the control cam 15 at the bottom of the groove 16 formed therein since use of equal diameter control means and receiving roll facilitates deposit of adjacent convolutions smoothly on the roll. The back-up roll 6 further embeds the wire convolutions into rubber sheet or ply on the roll surface after they are initially deposited by the cam 15.

From the foregoing, it should be realized that a relatively inexpensive, uncomplicated, simple but sturdy apparatus has been provided for depositing a plurality of adjacent convolutions onto a cylindrical surface, which convolutions can be at an appreciable angle to a radius or other line which is normal to a longitudinal axis of such cylinder so that the objects of the invention have been achieved.

While certain representative embodiments and details have been shown for the purpose of illustrating the invention, it will be apparent to those skilled in this art that various changes and modifications may be made therein without departing from the spirit or scope of the invention.

Having thus described my invention, what I claim is:

1. Apparatus for automatically depositing a continuous flexible cord, wire or the like in convolutions on a roll, which apparatus comprises a wind-up roll, means for rotating said roll, a driven shaft, a gear keyed to said shaft and movable axially therealong, a threaded shaft positioned parallel to and adjacent said driven shaft, a control drum, means connected to said control drum engaged with said threaded shaft, a gear secured to said control drum and meshing with said first named gear to drive said control drum and rotate it on said threaded shaft and move it axially therealong, a substantially oval shaped cam on the periphery of said control drum and having substantially the same diameter as said wind-up roll, the axial position of said first-named gear on said driven shaft being controlled by the axial position of said control drum on said threaded shaft, a guide shaft positioned parallel to said driven shaft adjacent said roll, a guide block in sliding telescoped engagement with said guide shaft, a guide finger secured to said block and extending therefrom to a point adjacent said wind-up roll, said guide finger having a guide aperture therein for threading a continuous cord therethrough to facilitate and control deposit of same on said roll, a cam engaging member, and means pivotally securing said cam engaging member to said block whereby the position of said block is controlled by rotation of said control drum.

2. Apparatus for automatically depositing a continuous flexible cord, wire, or the like in convolutions on a roll, which apparatus comprises a wind-up roll, means for rotating said roll, a driven shaft, a gear keyed to said shaft and movable axially therealong, a threaded shaft positioned parallel to and adjacent said driven shaft, a control drum engaged with said threaded shaft for movement therealong, a gear on said control drum and meshing with said first named gear to drive said control drum and rotate it on said threaded shaft to move it axially therealong, a substantially oval shaped cam on the periphery of said control drum and inclined at an angle of about 30° to 60° with the axis thereof, said cam having substantially the same diameter as said wind-up roll, a guide shaft positioned parallel to said driven shaft adjacent said roll, a guide block in sliding telescoped engagement with said guide shaft, a guide tube on said block and extending to a point adjacent said roll, cam engaging roll members, and means pivotally securing said cam engaging members to said block whereby the position of said block on said guide shaft is controlled by rotation of said control drum.

3. Apparatus for automatically depositing a continuous flexible cord, wire or the like in convolutions on a roll, which apparatus comprises a wind-up roll, a driven shaft, means for rotating said roll and being connected to said driven shaft, a gear keyed to said shaft and movable axially therealong, a threaded shaft positioned parallel to and adjacent said driven shaft, a control drum engaged with and carried by said threaded shaft, a gear on said control drum meshing with said first named gear to drive said control drum and rotate it on said threaded shaft to move it axially therealong, said control drum having a substantially oval shaped cam on the periphery thereof and defining a plane inclined at an angle of about 30° to a plane normal to the longitudinal axis thereof, a guide shaft positioned parallel to said driven shaft adjacent said roll, a guide block in sliding telescoped engagement with said guide shaft, a guide tube secured to said guide block for threading a continuous cord therethrough to facilitate deposit of same on said roll, cam engaging means, and means pivotally securing said cam engaging means to said guide block whereby the axial position of said guide block on said guide shaft is controlled by rotation of said control drum and the engagement of said cam and said cam engaging means.

4. Apparatus for automatically depositing a continuous flexible cord or the like in convolutions on a roll, which apparatus comprises a wind-up roll, a shaft, means for rotating said roll and said shaft, a gear keyed to said shaft and movable axially therealong, a threaded shaft positioned parallel to and adjacent said driven shaft, a control drum engaged with said threaded shaft for movement therealong, a gear on said control drum and meshing with said first named gear to drive said control drum and rotate it on said threaded shaft to move it axially therealong, means for retaining said gears in engagement, said control drum having a substantially oval shaped cam on the periphery thereof, a guide shaft positioned parallel to said driven shaft adjacent said roll, means in sliding telescoped engagement with said guide shaft, a cam engaging member, and means pivotally securing said cam engaging member to said means on said guide shaft whereby the position of said means on said guide shaft is controlled by said cam on said control drum.

References Cited in the file of this patent

UNITED STATES PATENTS

| Number | Name | Date |
|---|---|---|
| 561,114 | Kress | June 2, 1896 |
| 685,433 | Rivett et al. | Oct. 29, 1901 |
| 885,220 | Bayne et al. | Apr. 21, 1908 |
| 1,217,879 | Pye | Feb. 27, 1917 |
| 1,422,451 | Krusemark | July 11, 1922 |
| 1,516,648 | Schweiter | Nov. 25, 1924 |
| 1,519,522 | Weigel | Dec. 16, 1924 |
| 1,719,738 | Wayne | July 2, 1929 |
| 1,945,659 | Schweizer | Feb. 6, 1934 |
| 1,974,497 | Lenk | Sept. 25, 1934 |
| 1,980,113 | Taylor | Nov. 6, 1934 |
| 2,147,212 | Parks | Feb. 14, 1939 |
| 2,147,664 | Moncrieff et al. | Feb. 21, 1939 |
| 2,194,950 | Miesch | Mar. 26, 1940 |
| 2,244,851 | Reiners et al. | June 10, 1941 |
| 2,267,899 | Dersen | Dec. 30, 1941 |
| 2,450,187 | Day | Sept. 28, 1948 |